US012646128B2

(12) United States Patent
Izod et al.

(10) Patent No.: US 12,646,128 B2
(45) Date of Patent: Jun. 2, 2026

(54) METHODS AND SYSTEMS FOR MONITORING MENTAL HEALTH ENVIRONMENT

(71) Applicant: SAFEHINGE PRIMERA LIMITED, Glasgow (GB)

(72) Inventors: Martin Izod, Glasgow (GB); Matthew Marais, Glasgow (GB)

(73) Assignee: SAFEHINGE PRIMERA LIMITED, Glasgow (GB)

( * ) Notice: Subject to any disclaimer, the term of this patent is extended or adjusted under 35 U.S.C. 154(b) by 169 days.

(21) Appl. No.: 18/685,791

(22) PCT Filed: Aug. 22, 2022

(86) PCT No.: PCT/GB2022/052167
§ 371 (c)(1),
(2) Date: Feb. 22, 2024

(87) PCT Pub. No.: WO2023/026035
PCT Pub. Date: Mar. 2, 2023

(65) Prior Publication Data

US 2024/0362734 A1 Oct. 31, 2024

(30) Foreign Application Priority Data

Aug. 23, 2021 (GB) ...................................... 2112053

(51) Int. Cl.
*G06Q 50/22* (2024.01)
*G06Q 50/26* (2012.01)
(Continued)

(52) U.S. Cl.
CPC ........... *G06Q 50/22* (2013.01); *G06Q 50/265* (2013.01); *G08B 13/08* (2013.01); *G08B 21/0415* (2013.01); *G08B 21/0461* (2013.01)

(58) Field of Classification Search
CPC .. G06Q 50/22; G06Q 50/265; G06Q 10/0635; G08B 13/08; G08B 21/0415;
(Continued)

(56) References Cited

U.S. PATENT DOCUMENTS 7,911,348 B2 3/2011 Rodgers
9,875,450 B1 * 1/2018 Hendrick, III ..... G06Q 10/0631
(Continued)

FOREIGN PATENT DOCUMENTS

WO 2019/220089 A1 11/2019

OTHER PUBLICATIONS

International Searching Authority, PCT Search Report and Written Opinion Jan. 11, 2023, International Application No. PCT/GB2022/052167 (21 pages).

*Primary Examiner* — Curtis J King
(74) *Attorney, Agent, or Firm* — Dickinson Wright PLLC

(57) ABSTRACT

There is provided a method and system for monitoring a clinical response in a mental health environment. The method comprises receiving alarm data indicative of a triggered alarm associated with a door mounted within a door frame; receiving, from an angle sensor, angle data indicative of a measured angle of the door relative to the door frame; detecting an entry through the door in dependence on a change in the measured angle of the door indicated by the angle data; and outputting an indication of a clinical response in dependence on the detection of the opening of the door.

23 Claims, 6 Drawing Sheets

(51) Int. Cl.
*G08B 13/08* (2006.01)
*G08B 21/04* (2006.01)

(58) Field of Classification Search
CPC ............ G08B 21/0461; G08B 21/0423; G08B 21/043
See application file for complete search history.

(56) References Cited

U.S. PATENT DOCUMENTS

2006/0232405 A1* 10/2006 Filibeck .................. G07C 9/28 340/8.1
2006/0232406 A1* 10/2006 Filibeck .................. G07C 1/20 340/8.1
2008/0300816 A1* 12/2008 Tsai ..................... G08B 13/184 702/109
2010/0145164 A1* 6/2010 Howell ................. A61B 5/1113 600/301
2016/0076776 A1* 3/2016 Gardner .................. F24C 14/00 126/197
2016/0212506 A1* 7/2016 Norwood .......... H02J 13/00017
2016/0284202 A1* 9/2016 Traughber ............. G16H 80/00
2017/0148243 A1* 5/2017 Shin ................... G07C 9/00309
2017/0360335 A1* 12/2017 Washizawa ........... A61B 5/1118
2019/0051129 A1* 2/2019 Hunt ........................ G01B 7/14
2020/0071982 A1* 3/2020 Yulkowski .............. E05F 15/41
2021/0065885 A1* 3/2021 Receveur ............... G16H 40/67
2022/0058901 A1* 2/2022 Li ............................ G08B 7/06
2022/0217298 A1* 7/2022 Kasuya ................ H04N 9/8205
2022/0268087 A1* 8/2022 Wegner ................... E05F 15/73
2022/0268089 A1* 8/2022 Wegner ................... E05F 15/73
2022/0412645 A1* 12/2022 Bihr ...................... F25D 29/005
2023/0125619 A1* 4/2023 Li .......................... G08B 21/24 340/5.7
2023/0143606 A1* 5/2023 Becker ................... G16H 40/67 73/35.11
2023/0222404 A1* 7/2023 Norwood ........... G06Q 10/0631 700/83

* cited by examiner

METHODS AND SYSTEMS FOR MONITORING MENTAL HEALTH ENVIRONMENT

CROSS-REFERENCE TO RELATED APPLICATIONS

The present application is a 35 U.S.C. Section 371 national stage filing of International Patent Application No. PCT/GB2022/052167, filed 22 Aug. 2022, and through which priority is claimed to UK Patent Application GB 2112053.0, filed 23 Aug. 2021.

This invention relates to methods and systems for monitoring a mental health environment. In particular, the invention relates to monitoring a clinical response in a mental health environment, and to detecting an abnormal use of a door in a mental health environment.

BACKGROUND

There are a number of healthcare settings within which there is a risk that patients or inmates may seek to conceal the presentation of symptoms, damage the surroundings or otherwise do harm to themselves. One example of such an institution is in mental health institutions.

It is therefore of paramount importance that staff and healthcare providers in such institutions have suitable monitoring systems in place in order to rapidly identify and attend to incidents if they occur. However, it is also important to reduce the visibility or invasiveness of monitoring systems in mental health environments. This is because visible monitoring or other surroundings giving the environment an institutional feel can be distressing or harmful to recovery for patients. Thus, it is preferable to avoid placing equipment such as cameras or other intrusive monitoring equipment in patient rooms, to provide privacy.

There are a number of situations in which an alarm associated with a patient room may be raised. One such situation is in the case of a patient attempting to do harm to themselves or even end their own life, which may commonly be attempted by making a ligature on a door. As such, there have been developed door alarms which can be triggered if a ligature is detected on a door, such as described in WO/2019/220089. In this way, healthcare providers can be alerted to the attempted ligature so that they are able to prevent fatalities.

Once such an alarm has been raised however, the inventors have found that the problem of how to assess whether there has been an adequate clinical response to the alarm has not been appreciated. As such alarms are typically raised in emergency scenarios, any assessment requiring human intervention would not be desirable, as all available resources will be diverted to the emergency. Furthermore, as discussed in a mental health environment, it is desirable to provide such an assessment in an automated manner without necessitating intrusive monitoring equipment such as cameras.

Another event which may commonly occur in a mental health environment is a door barricade. In many cases a patient may obstruct a door (e.g. a bedroom door) to prevent it from swinging open. This may be done for various reasons, but in some cases the patient may wish to harm themselves or possibly end their own life. In other cases, it may be for nuisance value, or because the patient has become confused, frightened or otherwise disturbed. Whatever the reason for the barricade, it is desirable that it is resolved as quickly as possible, and with the minimum of disturbance and damage.

Barricades are typically only possible with a single-swing door, because a double-swing door can readily be opened in the other direction to allow the obstruction to be cleared. However, double-swing doors are often undesirable (e.g. in bedrooms), not least because they do not permit privacy and have an 'institutional' feel to them. It is known to provide an anti-barricade door stop, such as that described in WO 2016/181157 which when engaged prevents a door from swinging in both directions (i.e. creates a single swing door) but can be disengaged to permit opening of the door in the other direction such as to resolve a barricade. In such a situation, healthcare providers may omit to re-engage the anti-barricade doorstop after the barricade has been resolved. This is not desirable, as allowing the door to be used as a double-swing door can cause damage to the door with repeated opening, can create an 'institutional' feel which causes distress to patients, and further can create a security risk if staff are unaware the door may be opened in the other direction.

Accordingly, at least some aspects of the present invention are directed at overcoming the problems of the prior art.

BRIEF SUMMARY OF THE DISCLOSURE

In accordance with the present inventions there is provided a method and controller for monitoring a clinical response, and a method and controller for detecting an abnormal door use.

According to a first aspect there is provided a computer-implemented method of monitoring a clinical response in a mental health environment, comprising: receiving alarm data indicative of a triggered alarm associated with a door mounted within a door frame; receiving, from an angle sensor, angle data indicative of a measured angle of the door relative to the door frame; detecting an entry through the door in dependence on a change in the measured angle of the door indicated by the angle data; and outputting an indication of a clinical response in dependence on the detection of the opening of the door. Advantageously, it thus may be easily and automatically assessed whether there has been an adequate clinical response to the alarm necessitating intrusive monitoring equipment such as cameras. The alarm data may comprise an indication of the door, e.g. a door ID.

The alarm may be triggered in response to a detected ligature on the door.

Entry through the door may be alternatively or additionally be detected in dependence on receiving an indication from an access system, such as an electronic lock, that access has been granted at the door.

Optionally, the method may further comprise determining a clinical response time in dependence on the alarm data and the detected entry through the door. The alarm data may comprise an indication of a first time stamp associated with the triggering of the alarm, and the method may comprise determining a second time stamp associated with the detected entry through the door; and calculating the clinical response time as a difference between the first time stamp and the second time stamp. Alternatively, the method may comprise starting a clinical response timer in response to receiving the alarm data, and determining the clinical response time in dependence on a time of the response timer when the entry through the door is detected.

According to some embodiments, the method may comprise outputting an indication of an absence of clinical response if the response timer exceeds a threshold time. For example, the method may comprise triggering an additional alarm packet.

Optionally, the method may comprise comparing the clinical response time to a reference clinical response time and outputting an indication of the result of the comparison. The reference clinical response time may be an average clinical response time. The average response time may be defined for the particular door, or it may be an average across a particular set of doors (e.g. for a particular ward, building, Trust, region or nation). In this way, patterns indicating sub-optimal clinical response for a particular door, or particular ward or building may be identified.

The angle data may comprise a time series of angle values each indicative of a measured angle of the door relative to the door frame. Optionally, detecting the entry through the door comprises determining a difference between a first angle value and a second angle value of the angle data and detecting that the difference is greater than a threshold value. The first angle value may correspond to a time of the triggering of the alarm and the second angle value may correspond to a time subsequent to the triggering of the alarm. Optionally, the threshold value is at least 5°. For example, the threshold value may be 6°, 7° or 8°.

According to another aspect, there is provided a controller for monitoring a clinical response in a mental health environment, comprising: a communication module configured to receive alarm data indicative of a triggered alarm associated with a door mounted within a door frame, and receive from an angle sensor angle data indicative of a measured angle of the door relative to the door frame; one or more processors; and a memory storing computer executable instructions therein which, when executed by the one or more processors, cause the one or more processors to: detect an opening of the door in dependence on a change in the measured angle of the door indicated by the angle data; and output an indication of a clinical response in dependence on the detection of the opening of the door.

The controller may be arranged to perform the method according to the above aspect.

According to another aspect, there is provided a computer-implemented method of detecting an abnormal use of a door in a mental health environment, comprising: receiving, from an angle sensor, angle data indicative of a measured angle of the door relative to a door frame in which the door is mounted; determining, in dependence on the measured angle of the door, whether the door is in an open state; if the door is in an open state, determining in dependence on the measured angle a direction of the door to be a first direction or a second direction relative to the door frame; and outputting a signal indicative of an abnormal door use if the direction of the door transitions between the first direction and the second direction.

The method optionally comprises determining that the door is in an open state if the measured angle of the door is at least a threshold angle from the door frame. For example, the threshold angle may be between 5° and 10°, such as 5°, 7° and 10°.

The direction of the door may be determined to be in a first direction if the measured angle is positive and in a second direction if the measured angle is negative.

The method may comprise outputting the signal indicative of an abnormal door use if the direction of the door transitions between the first direction and the second direction at least a predetermined number of times. For example, the predetermined number may be between 2 and 10 times, such as 4, 5 or 6 times.

Optionally, outputting the signal indicative of an abnormal door use comprises communicating an alert to a user device. The alert may be for display or may be otherwise output on the user device as a visible or audible notification. Alternatively or additionally, outputting the signal indicative of an abnormal door use may comprise communicating the signal to an alarm to trigger the alarm.

Optionally, the method comprises determining one of the first direction and the second direction to be a permitted direction and determining the other of the first direction and the second direction to be a non-permitted direction. The method may comprise providing an anti-barricade door stop for preventing the door opening in the non-permitted direction when engaged. The anti-barricade door stop may be either a removable or retractable door stop in some embodiments.

The permitted direction may be determined in dependence on historical angle data indicative of a historical frequency of each door direction. For example, a most historically frequent door direction can be determined to be the permitted direction.

The method may comprise outputting a signal indicative of an abnormal door use if the direction of the door is in the non-permitted direction. In some embodiments, the method comprises outputting a signal indicative of an abnormal door use if the direction of the door remains in the non-permitted direction for at least a threshold time. For example, the threshold time may be between 1 minute and 25 minutes, such as 5 minutes, 10 minutes, 15 minutes or 20 minutes.

According to another aspect there is provided a controller for detecting an abnormal use of a door in a mental health environment, comprising: a communication module configured to receive, from an angle sensor, angle data indicative of a measured angle of the door relative to a door frame in which the door is mounted; one or more processors; and a memory storing computer executable instructions therein which, when executed by the one or more processors, cause the one or more processors to: determine, in dependence on the measured angle of the door, whether the door is in an open state; if the door is in an open state, determine in dependence on the measured angle a direction of the door to be a first direction or a second direction relative to the door frame; and output a signal indicative of an abnormal door use if the direction of the door transitions between the first direction and the second direction.

The controller may be configured to perform a method according to the above aspect.

According to another aspect there is provided computer software which, when executed, is arranged to perform a method according to any of the above aspects.

BRIEF DESCRIPTION OF THE DRAWINGS

Embodiments of the invention are further described hereinafter with reference to the accompanying drawings, in which.

DETAILED DESCRIPTION

Figure 1:
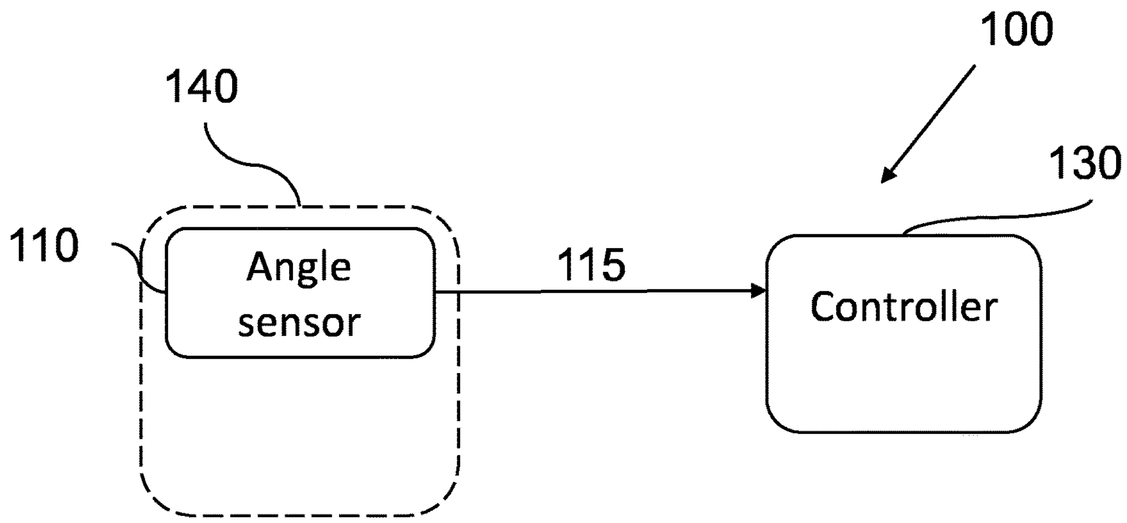
FIG. 1 is a schematic of a system 100 according to an embodiment of the invention.

With reference to FIG. 1, there is shown a schematic of a system 100 for a mental health environment according to an embodiment of the present invention. The system 100 may be used to monitor a clinical response or detect an abnormal use of a door.

Figure 2:
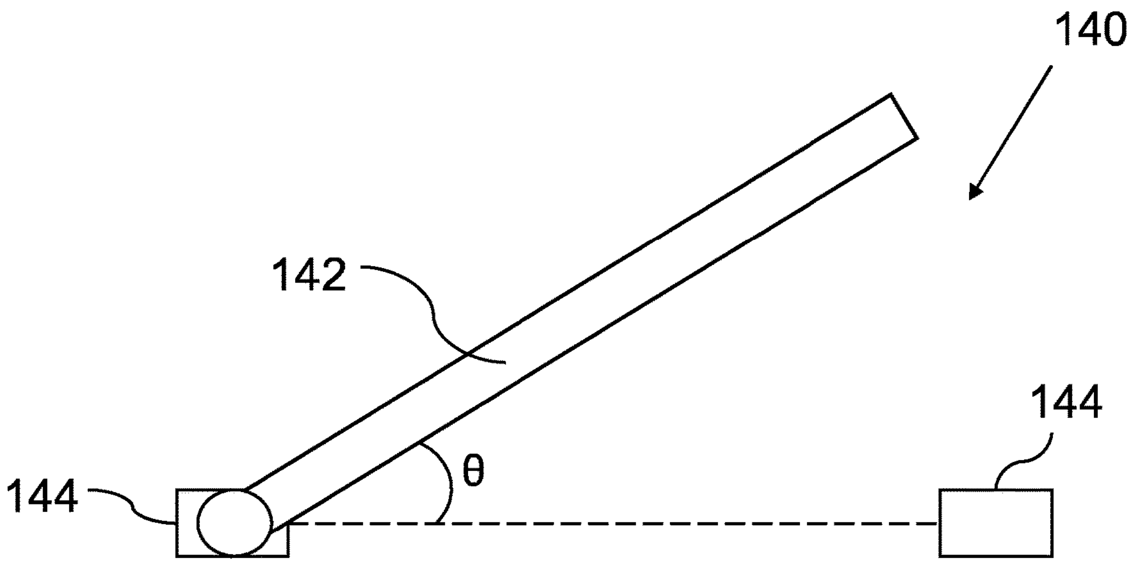
FIG. 2 shows an illustration of a door angle.

The system 100 comprises an angle sensor 110 and a controller 130. The angle sensor 110 is associated with a door apparatus 140. As shown in FIG. 2, the door apparatus 140 comprises a door 142 which is mounted, via mounting means such as a hinge, on a door frame 144. The angle sensor 110 is configured to detect an angle θ of the door 142 with respect to the door frame 144.

The angle sensor 110 is communicatively coupled to a controller 130. The angle sensor 110 may be connected to the controller 130 via a wired connection or may be coupled wirelessly. For example, a wireless connection may be provided via a short-range communication protocol such Bluetooth, NFC, Sub-GHz, Wi-Fi or the like. In some embodiments, the angle sensor 110 may be connected to the controller 130 indirectly via one or more networks such as a local area network (LAN) or the Internet. The angle sensor 110 is configured to transmit angle data 115 to the controller 130, the angle data 115 comprising a measured angle θ of the door relative to the door frame. The angle sensor 110 is configured to continuously or periodically transmit the angle data 115 to the controller 130, such that the controller 130 is provided with a time series of angle measurements.

Figure 3:
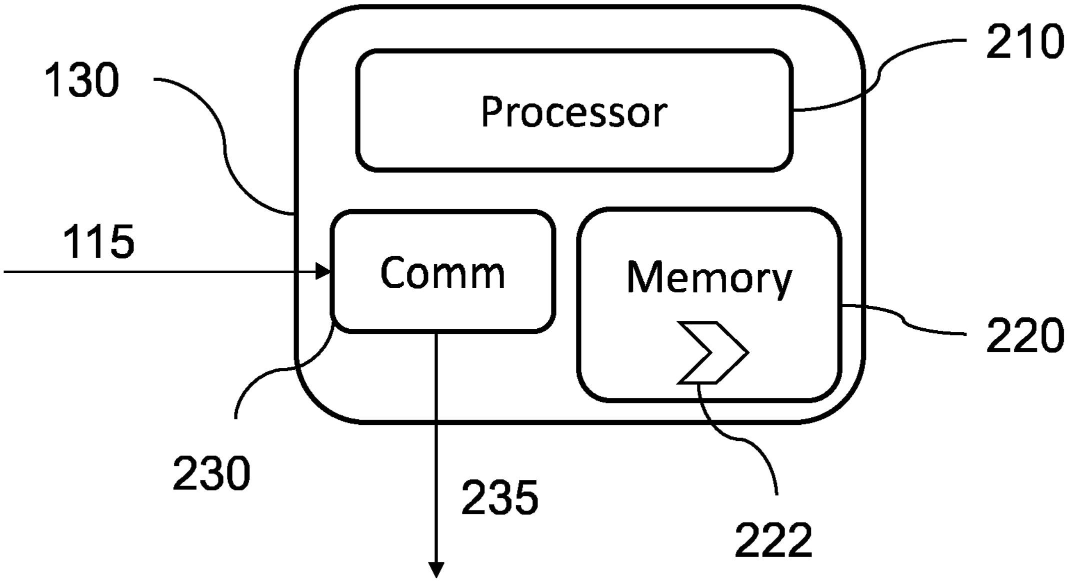
FIG. 3 is a block diagram of a controller 130 according to an embodiment of the invention.

Referring to FIG. 3, there is shown a block diagram of the controller 130. The controller 130 comprises a memory device 220, a processor 210 and a communication module 230. The controller 130 is adapted to receive, through the communication module 230, the angle data 115 from the angle sensor 110. The memory 220 is configured to store computer-readable instructions 222 which when executed, cause the processor 210 to perform methods according to the present invention. The processor 210 may be configured to process the angle data 115 and determine an output signal 235, which may be output by the communication module 230 to an external apparatus as will be explained.

The controller 130 may be mounted on or within the door apparatus 140, e.g. in order to provide a wired connection to the angle sensor 110. In other embodiments, the controller 130 may be remote and may communicate wirelessly with the angle sensor 110.

The angle sensor 110 may be disposed on a mounting means of the door 142, such as on a pivot or hinge, in order to measure the angle between the door 142 and the door frame 144. In some embodiments the angle sensor 110 may comprise a magnet and magnetic angle detector. Other angle sensors 110 may also be envisaged. The angle sensor 110 is configured to transmit the angle data 115 to the controller 130. The angle sensor may continually sample the angle of the door in order to measure the change in angle over time, and continually or periodically transmit the measurements to the controller 130 to provide a time series of angle values. In some embodiments, the angle sensor 110 may be integrated in a load measuring apparatus for a door alarm, such as the load measuring device described in WO/2019/220089. In this way, an existing apparatus associated with the door can be repurposed for the methods of the present invention, thus reducing the total amount of monitoring equipment deployed at the door apparatus 140.

Monitoring of Clinical Response

The system 100 may be provided for monitoring a clinical response in a mental health environment according to some embodiments.

Figure 4:
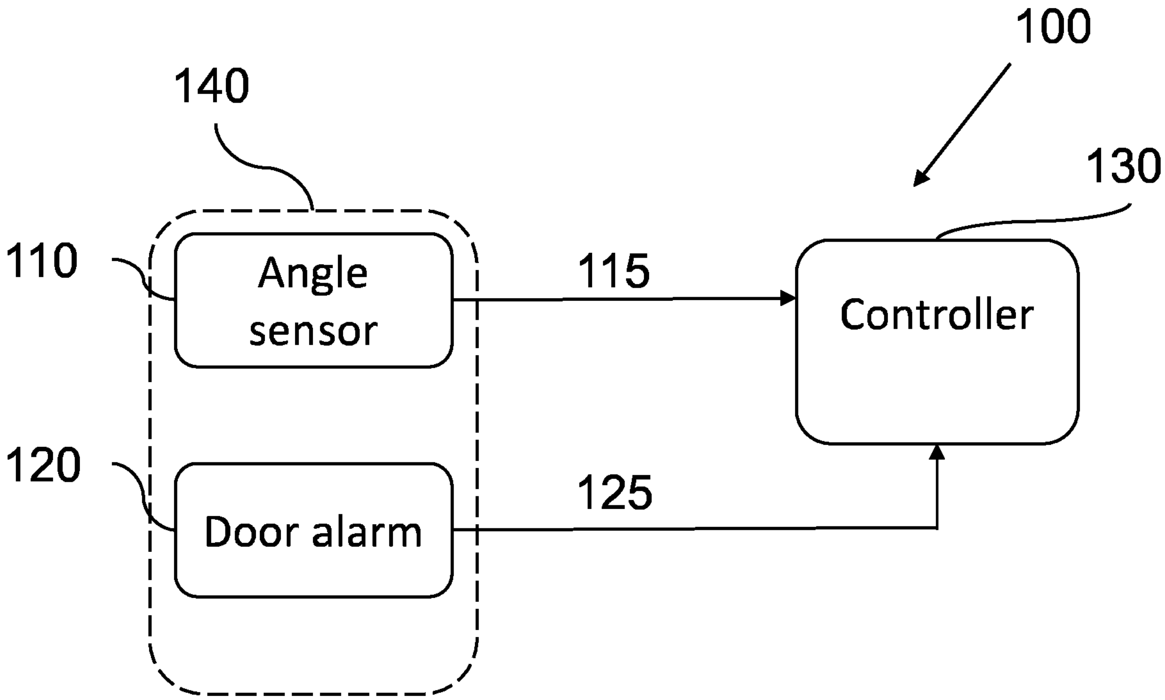
FIG. 4 is a schematic of a system 100 according to an embodiment of the invention.

With reference to FIG. 4, the system 100 may further comprise a door alarm 120 associated with the door apparatus 140. The door alarm 120 may be any alarm associated with the door apparatus 140 or the room into which the door apparatus 140 provides access. For example, the door alarm 120 may be triggered in the event of a need for clinical response in the room, such as a bedroom of a patient, into which the door apparatus 140 provides access. In some embodiments, the door alarm 120 is triggered in response to a detected ligature on the door 142. An example of a door alarm 120 which is triggered in response to a detected ligature on the door is described in detail in WO/2019/220089. The door alarm 120 may be communicably coupled to the controller 130 and be configured to output alarm data 125 to the controller 130 in response to the alarm being triggered. In other embodiments, the door alarm 120 may be integrated with the controller 130. That is, the determination to trigger the alarm may be made at the controller 130 in response to receiving sensing data such as load sensing data indicative of a detected ligature. In such embodiments, the alarm data 125 may be determined by the controller 130.

The controller 130 is configured to monitor a clinical response to the triggered alarm in dependence on the alarm data 125 and the angle data 115, as will be explained. A clinical response may be defined as attendance at the door apparatus 140 by a healthcare provider or other person in response to the triggering of the door alarm 120. According to the present invention, the controller 130 is configured to provide an automated detection of a clinical response. Providing an automated detection of a clinical response advantageously enables a response time between the triggering of the alarm 120 and the clinical response to be automatically measured, which facilitates the rapid identification of any issues in the clinical environment, for example identifying particular rooms or times of day for which the response time is slow. This provides the healthcare providers with the ability to address these previously unidentified issues, e.g. by adjusting training or staffing requirements. Furthermore, an automated detection of a clinical response further enables the automated detection of a lack of clinical response, i.e. a lack of any clinical response within a predetermined time of the alarm trigger. Identifying that no clinical response has been provided for the alarm can enable the issue to be addressed by providing a further wider alarm or alert, such as to a wider clinical team or the emergency services.

Figure 5:
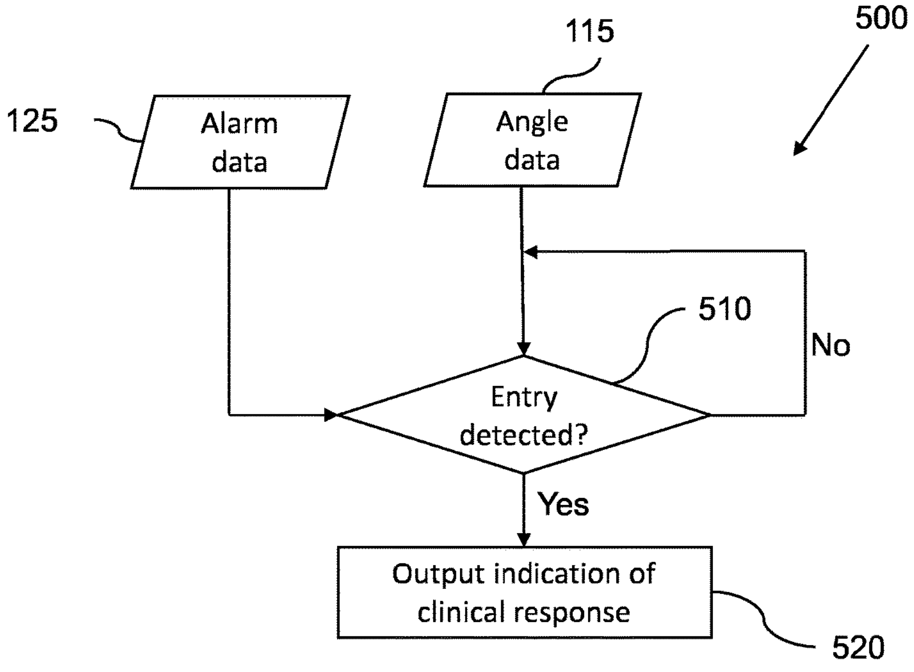
FIG. 5 shows a flow chart of a method 500 according to an embodiment of the invention.

With reference to FIG. 5, there is shown a flow chart of a method 500 of monitoring a clinical response according to the present invention. The method 500 may be performed at least in part by the controller 130.

The method 500 comprises receiving the alarm data 125 indicative of the door alarm 120 being triggered. As discussed previously, the alarm data 125 may be communicated to the controller 130 from an external door alarm 120. In other embodiments, the door alarm 120 may be integrated with the controller 130, that is the controller 130 may be configured to control the door alarm 120. In this case, the alarm data 125 may be determined by the controller 130. The alarm data 125 may comprise an indication of the door 142 for which the alarm has been triggered, e.g. a door ID for the door 142, and a time at which the alarm was triggered. For example, the alarm data 125 may comprise a timestamp indicating the time at which the alarm was triggered. In other embodiments, the time may be inferred by the controller 130, such as in dependence on the time at which the alarm data 125 was received at the controller 130. The controller 130 may be configured to perform the method 500 in response to receiving the alarm data 125. That is, steps 510 and 520 as will be described may selectively be performed after the door alarm 120 has been triggered.

The method 500 comprises receiving the angle data 115 from the angle sensor 110. As discussed, the angle sensor 110 may continually sample the angle of the door in order to measure the change in angle over time, and continually or periodically transmit the measurements to the controller 130 to provide a time series of angle values.

The method 500 comprises a step 510 of determining whether an entry through the door 142 is detected in dependence on the angle data 115. In some embodiments, it may be determined that an entry is detected if the angle of the door exceeds a threshold value which is sufficient to enable passage through the door 142. In other embodiments, step 510 may comprise monitoring a change in the measured angle of the door indicated by the angle data 115 since the triggering of the alarm. That is, step 510 comprises determining a difference between at least a first angle value and a second angle value of the angle data 115 since the triggering of the alarm. The first angle value may correspond to the time at which the alarm was triggered. Thus, step 510 may comprise determining a difference between a current angle value and the first angle value. If the difference is greater than a threshold value, it is determined that an entry through the door is detected, and the method proceeds to step 520. If the difference is not greater than the threshold value no entry is detected, and the method continues by continuing to receive the angle data 115 and monitor whether an entry is detected in step 510.

The threshold value may be selected to be a minimum change in angle to enable a person to enter through the door. For example, the threshold value may be between 5° and 10°, such as 7° or 8°. In some embodiments, the threshold value may be set differently depending on the initial angle of the door when the alarm is triggered. That is, if the door is closed, the threshold value may be set higher than if the door is currently open. This is because the door will need to move through a greater angle to allow entry from closed than if already ajar.

In step 520, an indication of the detection of a clinical response is output as a signal 235. The signal 235 may be output to a display or user interface associated with the controller 130 for providing a notification to the user of the system 100. Alternatively, or additionally, the indication of the clinical response may be output to an external device for providing an alert to the healthcare providers associated with the mental health environment. The external device may be any computing device, such as a laptop, personal computer, mobile phone, tablet or the like. The external device may be communicably coupled to the controller 130 via a wired connection or may be coupled wirelessly. For example, a wireless connection may be provided via a short-range communication protocol such Bluetooth, NFC, Wi-Fi or the like. In some embodiments, the connection may be provided indirectly via one or more networks such as a local area network (LAN) or the Internet. The external device may be provided for outputting information to the healthcare providers regarding the alarm system, such as via a display. An indication that the alarm has been triggered may be displayed or otherwise output by the external device. When the clinical response is detected in step 510, the indication of the clinical response may then be communicated to the external device for notifying the healthcare provider or other user that the alarm has been responded to.

In some embodiments, the method 500 may comprise determining a clinical response time in dependence on the alarm data 125 and the entry detected in step 510. The clinical response time may be determined by starting a clinical response timer in response to the receipt of the alarm data 125. The timer may then be stopped once the clinical response is detected in step 510, and the clinical response time can be determined as the time of the response timer when the clinical response is detected.

Figure 6:
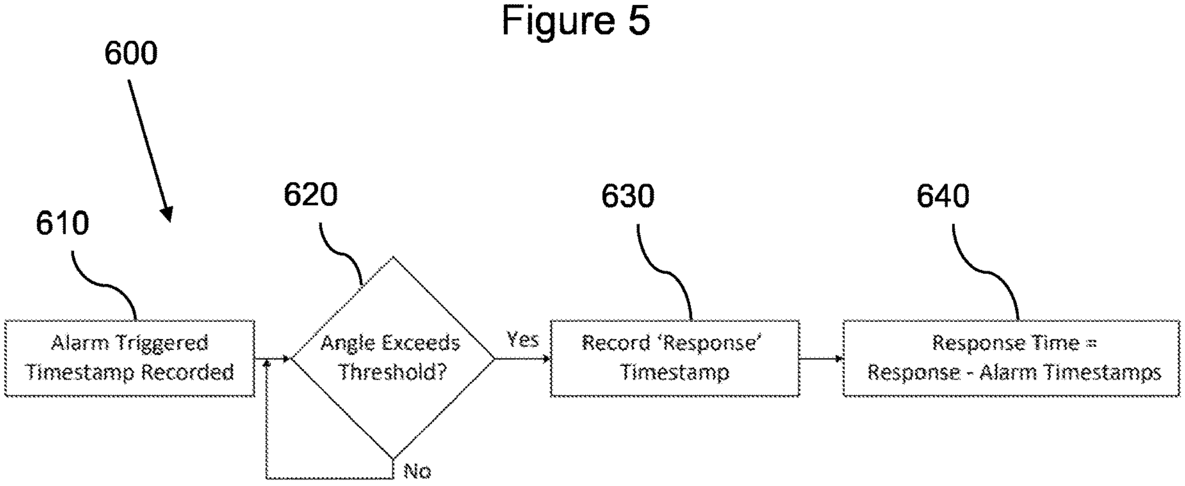
FIG. 6 shows a flow chart of a method 600 according to an embodiment of the invention.

Another embodiment of a method 600 including determining a clinical response is shown in FIG. 6. In step 610, the alarm is triggered, and the alarm data is received by the controller 130. The alarm data may comprise a first time stamp associated with the triggering of the alarm, or the controller 130 may determine the first time stamp in dependence on the receipt of the alarm data 125. The first time stamp is recorded in the memory 220. In step 620, it is determined whether entry through the door 142 is detected. Step 620 corresponds to step 510 of the method 500. When entry is detected, the method proceeds to step 630 and a second time stamp is determined, the second time stamp being indicative of the time at which the entry was detected. In step 640, the clinical response time can be calculated as a difference between the first time stamp and the second time stamp.

The clinical response time may be determined and output with the indication of the clinical response in step 520. The clinical response time may be utilised immediately, for example to display to the healthcare providers at the display associated with the controller 130 or at the external device. The clinical response time may be stored for subsequent analysis, e.g. on the external device or in the memory 220.

The method 500 or 600 may comprise comparing the clinical response time to a reference clinical response time. The reference clinical response time may be a predetermined benchmark for an acceptable time, as determined by the healthcare provider. The reference clinical response time may be derived from historical clinical response data associated with the door alarm or with a wider mental health system comprising a collection of door alarms. The reference clinical response time may for example be an average clinical response time for the door alarm, or for the wider system. It may be desired to identify instances with insufficient or slow clinical response. Thus, if the clinical response time is slower than the reference clinical response time, an indication to flag the clinical response may be output in step 520. In this way, ongoing clinical response data obtained through the method 500 may be collected by the controller 130 or external device and the instances of slow clinical response can be compared to those of sufficient clinical response, in order to identify trends which can enable the healthcare provider to address any problems. For example, it may be found that alarms triggered at a particular time of day, day of the week or for a particular individual door or institution have a consistently slower clinical response, which can help identify problems with the environment such as in layout or staffing.

Generally, for most standard alarm systems, a triggered alarm needs to be manually acknowledged by a staff member. The manual acknowledgement informs the alarm system that the triggered alarm has been attended and causes the alarm to cease. In some unprecedented situations, due to a failure by the healthcare institution or by staff members, it may be possible that even following the acknowledgement, the incident is not attended to by the responsible persons. That is, a staff member may turn off the alarm but not attend the door. This may occur in situations where an alarm is repeatedly being triggered by a patient as a false alarm. In such situations, it can be of paramount importance that this failure to physically attend the room is identified and rectified rapidly. The present invention can provide a safeguard for such situations. In particular, the automated detection of a clinical response in step 510 also facilitates the detection of a lack of clinical response. Thus, the method may comprise outputting in step 520 an indication of an absence of clinical response if no clinical response is detected. It may be determined that there has been an absence of clinical response if a threshold time has elapsed since the alarm was triggered and no entry through the door has been detected. The indication of a lack of clinical response may be output to provide a notification to the external device and/or may be communicated to a wider clinical team, for example by triggering a second alarm at a second location.

Figure 7:
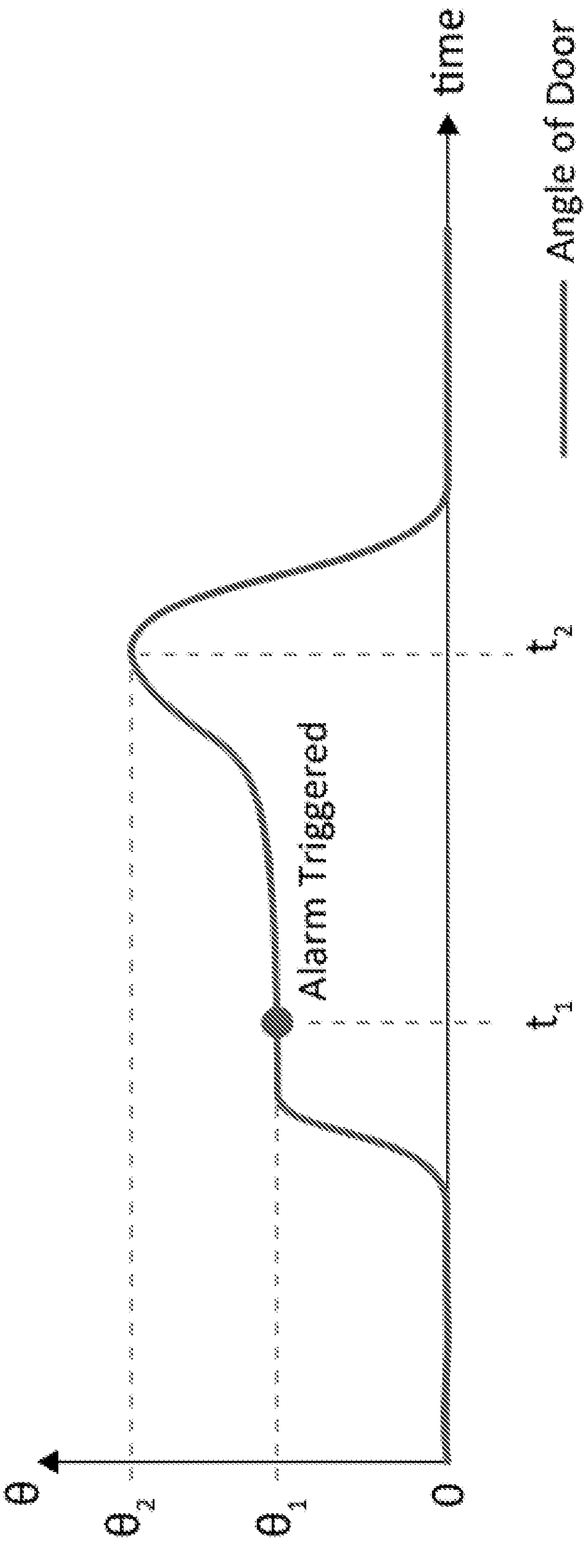
FIG. 7 shows example data illustrating a clinical response.

With reference to FIG. 7, there is shown example angle data 115 plotted against time. At the time point $t_1$ the alarm is triggered and the method 500 is initiated. When the alarm is triggered, the angle of the door is at a first angle $\theta_1$. The method 500 comprises monitoring the door angle for detection of a clinical response as the angle data 115 continues to be received. At time $t_2$, the door angle reaches a second angle $\theta_2$. Entry through the door is thus detected at time $t_2$ as it is determined that the difference between $\theta_1$ and $\theta_2$ is greater than a threshold angle. The clinical response time may then be calculated as $t_2$-$t_1$.

Detection of Abnormal Door Use

The system 100 may be provided for detecting an abnormal use of the door 142, in particular following resolution of a door barricade.

A door barricade occurs when a patient obstructs a door (e.g. the door 142) to prevent it from swinging open. Barricades are typically only possible with a single-swing door, because a double-swing door can readily be opened in the other direction to allow the obstruction to be cleared. However, as discussed, double-swing doors are often undesirable because they do not permit privacy and can cause patient distress.

Figure 8:
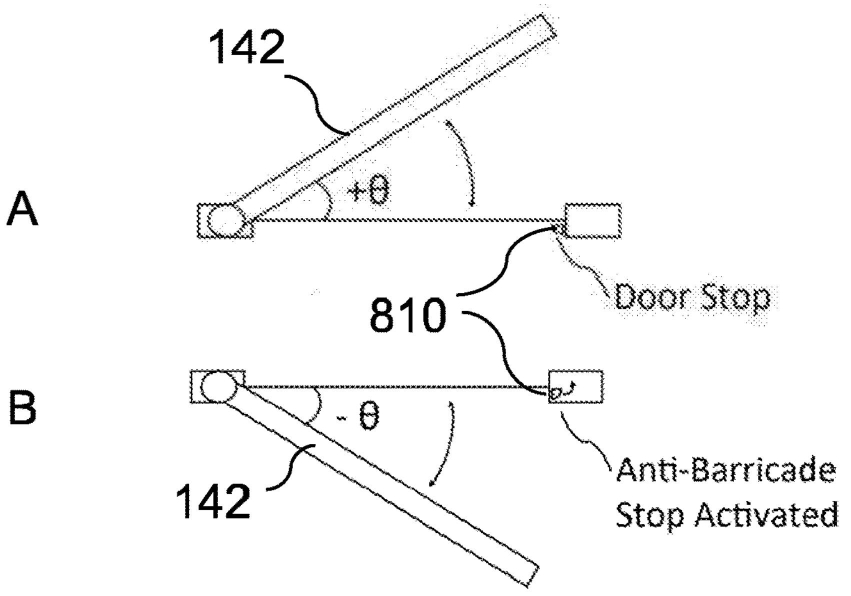
FIG. 8 shows an illustration of a door with an anti-barricade door stop.

With reference to FIG. 8, in order to enable the resolution of a door barricade whilst retaining a sense of privacy, the door 142 may be a double-swing door and be provided with an anti-barricade door stop 810. An example anti-barricade doorstop 810 is described in WO 2016/181157. The anti-barricade doorstop is configured to prevent the door 142 from swinging in both directions (i.e. creates a single swing door) when engaged, as shown in panel A of FIG. 8. The anti-barricade doorstop 810 enables the door 142 to open in a first direction having a positive angle with respect to the door frame 144 but prevents the door 142 from opening in a second direction having a negative angle with respect to the door frame 144. In a door barricade situation, the door stop 810 can be disengaged as shown in panel B to permit opening of the door 142 in the second direction to resolve the barricade. In such a situation, healthcare providers may omit to re-engage the anti-barricade doorstop 810 after the barricade has been resolved. This is not desirable, as allowing the door 142 to be used as a double-swing door can cause damage to the door with repeated opening, can create an 'institutional' feel which causes distress to patients, and further can create a security risk if staff are unaware the door may be opened in the other direction.

Figure 9:
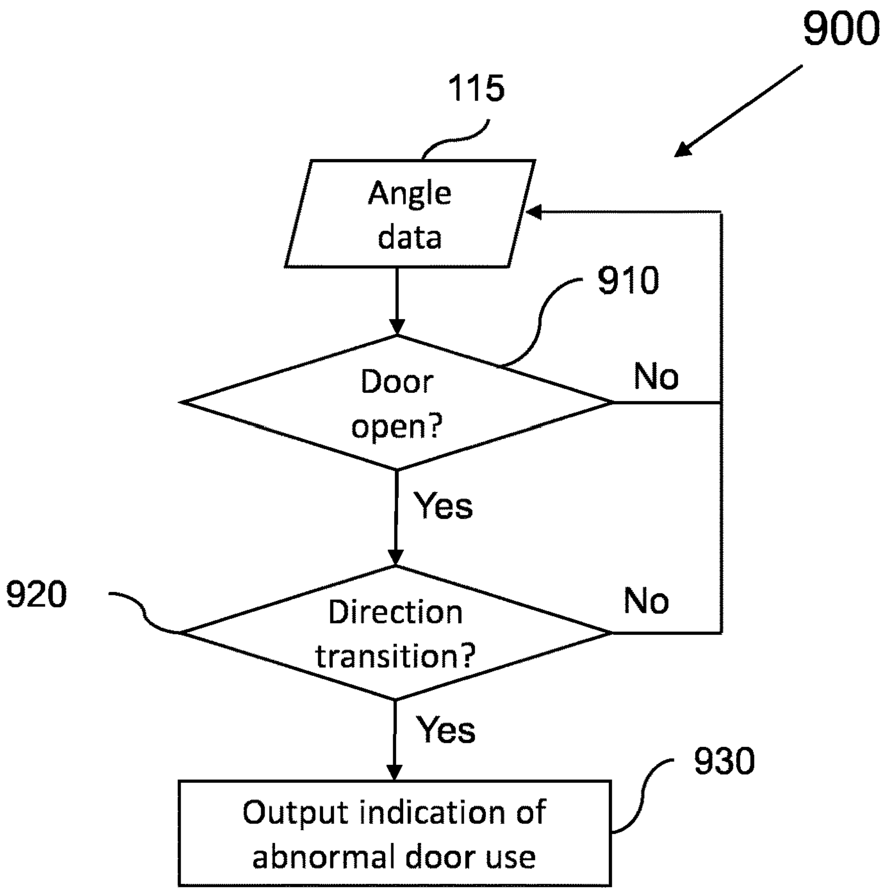
FIG. 9 shows a flow chart of a method 900 according to an embodiment of the invention.

With reference to FIG. 9, the controller 130 may be arranged to perform a method 900 for detecting an abnormal use of a door 142, such as for detecting when an anti-barricade door stop 810 is disengaged.

The method 900 comprises receiving the angle data 115 from the angle sensor 110, as described.

The method 900 comprises a step 910 of determining in dependence on the angle data 115 whether the door 142 is in an open state. The door 142 is determined to be open if the measured angle of the door e is at least a threshold angle from the door frame. The threshold may be 0°, i.e. the door may be determined to be open if there is any displacement between the door and the door frame. In other embodiments, the threshold angle may be non-zero in order to account for measurement errors from the angle sensor 110 and small fluctuations in the door position. For example, the threshold angle may be between 1° and 10°, such as 3°, 5° or 7°. The door is determined to be open if the measured angle of the door 142 exceeds the threshold in either direction with respect to the door frame 144, i.e. whether the measured angle is positive or negative.

If the door 142 is open, the method 900 proceeds to step 920 and a direction of the door 142 is determined. The direction of the door 142 is determined to be a first direction or a second direction relative to the door frame 144 in dependence on the measured angle indicated by the angle data 115. The direction of the door 142 is determined to be the first direction if the measured angle is positive, as shown in FIG. 8A, and the second direction of the measured angle is negative, as shown in FIG. 8B.

The method 900 comprises monitoring the direction of the door 142 over time. If it is determined that the direction of the door 142 transitions between the first direction and the second direction over time, i.e. the angle data 115 indicates that the door 142 is operating as a double swing door, it is determined that there is abnormal door use and the method proceeds to step 930. In step 930, a signal 235 is output from the controller 130 indicative of the abnormal door use. As in method 500, the signal 235 may be output to a display or user interface associated with the controller 130 for providing a notification to the user of the system 100 such as a healthcare provider. Alternatively, or additionally, the signal 235 may be output to the external device for providing an alert to the healthcare provider, e.g. by displaying a notification on the external device. The external device may be part of an alarm system, and thus the signal 235 may be output to an alarm system for triggering a doorstop alarm to alert the healthcare provider that the anti-barricade doorstop 810 has been left disengaged.

In some embodiments, the method only proceeds to step 930 if the direction of the door 142 transitions between the first direction and the second direction at least a predetermined number of times. That is, if the door 142 cycles between the first direction and the second direction it is determined that the door is being used in both directions and the doorstop 810 has not been engaged. The predetermined number of times may be for example between 2 and 10 times, such as 4, 5 or 6 times. In this way, ordinary use in resolving a barricade before re-engaging the doorstop will not be flagged as an abnormal use.

One of the first direction and the second direction may be identified as a permitted direction, i.e. a direction in which the door can open when the doorstop 810 is engaged. In the example of FIG. 8, the first direction as shown in FIG. 8A can be identified as the permitted direction. The permitted direction may be predetermined on configuration of the system 100 and stored in the memory 220. Alternatively, the permitted direction may be determined by the controller 130 in dependence on historical angle data indicative of a historical frequency of each door direction. The most frequent door direction may be identified as the permitted direction.

Step 930 may then comprise outputting the signal 235 indicative of abnormal door use if it is determined that the door 142 is in the non-permitted direction. In some embodiments, the method 900 comprises determining whether the door 142 remains in the non-permitted direction for at least a threshold time. If the door remains in the non-permitted direction for at least the threshold time, the indication is output in step 930. Otherwise, the door use may be determined to be normal and no signal 235 may be output. The threshold time may be for example 5 minutes, 10 minutes or 15 minutes. If the door is only in the non-permitted direction for less than the threshold, it may be undesirable to provide an alert as the anti-barricade doorstop may have been disengaged in normal use to resolve a barricade. However, if the door remains open in the anti-barricade direction for more than the threshold, this could be indicative of an ongoing serious incident. That is, if the door remains open in the anti-barricade direction for more than the threshold it may be indicative that staff are still at the door attending to an incident which caused the anti-barricade doorstop to be disengaged, e.g. a barricade event or a ligature event. If the incident remains ongoing, it may be beneficial to notify further staff members to alert them to the ongoing situation. Thus, if the threshold time is exceeded in the non-permitted direction, this may be flagged and the signal indicating abnormal door use is output in step 930.

Figure 10:
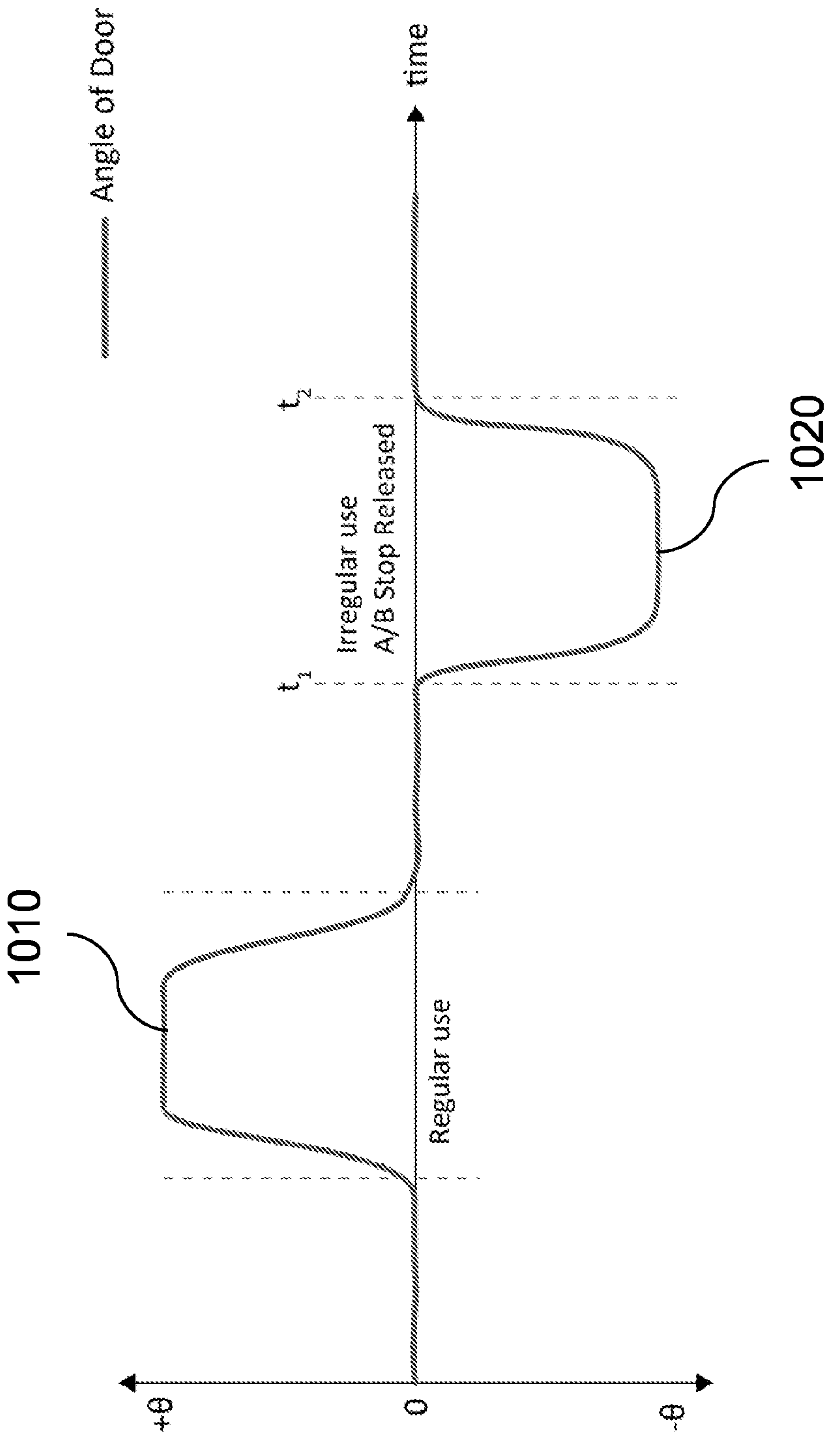
FIG. 10 shows example data showing normal and abnormal door use.

With reference to FIG. 10, there is shown example angle data received during the method 900. In the first period 1010 in which the door is determined to be open, the direction of the door is in the first direction. In the second period 1020 in which the door is again determined to be open, the direction of the door is in the second direction. Thus, in the second period 1020 it is determined that the direction of the door has transitioned in step 920, and the method proceeds to step 930 to output an indication of abnormal door use.

The present invention thus provides methods and systems for monitoring a mental health environment, in particular for monitoring a clinical response to an alarm and for detecting abnormal door use in an automated manner without using intrusive monitoring equipment. In this way, healthcare providers may be easily alerted to potentially serious incidents, and environmental issues within an institution impacting a level of patient care can be readily identified and resolved.

The term 'processor' is to be interpreted broadly to include a CPU, processing unit, ASIC, logic unit, or programmable gate array etc, and may refer to a single processor or a combination of several processors. Certain aspects of the disclosure may be implemented using machine-readable instructions which may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The functional modules may be implemented in a single processor or divided amongst several processors.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A computer-implemented method of monitoring a clinical response in a mental health environment, comprising:

receiving alarm data indicative of a triggered alarm associated with a door mounted within a door frame;

receiving, from an angle sensor, angle data indicative of a measured angle of the door relative to the door frame;

detecting an entry through the door in dependence on a change in the measured angle of the door indicated by the angle data; and outputting an indication of a clinical response in dependence on the detection of the opening of the door.

2. The method of claim 1, further comprising determining a clinical response time in dependence on the alarm data and the detected entry through the door.

3. The method of claim 2, wherein the alarm data comprises an indication of a first time stamp associated with the triggering of the alarm, and wherein the method comprises:
determining a second time stamp associated with the detected entry through the door; and
calculating the clinical response time as a difference between the first time stamp and the second time stamp.

4. The method of claim 2, comprising starting a clinical response timer in response to receiving the alarm data, and determining the clinical response time in dependence on a time of the response timer when the entry through the door is detected.

5. The method of claim 4, comprising outputting an indication of an absence of clinical response if the time of the response timer exceeds a threshold time.

6. The method of claim 2, comprising comparing the clinical response time to a reference clinical response time, and outputting an indication of the result of the comparison.

7. The method of claim 1, wherein the angle data comprises a time series of angle values each indicative of a measured angle of the door relative to the door frame.

8. The method of claim 7 wherein detecting the entry through the door comprises determining a difference between a first angle value and a second angle value of the angle data and detecting that the difference is greater than a threshold value.

9. The method of claim 8, wherein the threshold value is at least 5°.

10. A controller for monitoring a clinical response in a mental health environment, comprising:
a communication module configured to receive alarm data indicative of a triggered alarm associated with a door mounted within a door frame, and receive from an angle sensor angle data indicative of a measured angle of the door relative to the door frame;
one or more processors; and
a memory storing computer executable instructions therein which, when executed by the one or more processors, cause the one or more processors to:
detect an opening of the door in dependence on a change in the measured angle of the door indicated by the angle data; and
output an indication of a clinical response in dependence on the detection of the opening of the door.

11. A computer-implemented method of detecting an abnormal use of a door in a mental health environment, comprising:
receiving, from an angle sensor, angle data indicative of a measured angle of the door relative to a door frame in which the door is mounted;
determining, in dependence on the measured angle of the door, whether the door is in an open state;
if the door is in an open state, determining in dependence on the measured angle a direction of the door to be a first direction or a second direction relative to the door frame; and
outputting a signal indicative of an abnormal door use if the direction of the door transitions between the first direction and the second direction.

12. The method of claim 11, comprising determining that the door is in an open state if the measured angle of the door is at least a threshold angle from the door frame.

13. The method of claim 11, wherein the direction of the door is determined to be in a first direction if the measured angle is positive and in a second direction if the measured angle is negative.

14. The method of claim 11, comprising outputting the signal indicative of an abnormal door use if the direction of the door transitions between the first direction and the second direction at least a predetermined number of times.

15. The method of claim 11, wherein outputting the signal indicative of an abnormal door use comprises communicating an alert to a user device.

16. The method of claim 11, wherein outputting the signal indicative of an abnormal door use comprises communicating the signal to an alarm to trigger the alarm.

17. The method of claim 11, comprising determining one of the first direction and the second direction to be a permitted direction, and determining the other of the first direction and the second direction to be a non-permitted direction.

18. The method of claim 17, comprising providing an anti-barricade door stop for preventing the door opening in the non-permitted direction when engaged.

19. The method of claim 17, wherein the permitted direction is determined in dependence on historical angle data indicative of a historical frequency of each door direction.

20. The method of claim 17, comprising outputting a signal indicative of an abnormal door use if the direction of the door is in the non-permitted direction.

21. The method of claim 20, comprising outputting a signal indicative of an abnormal door use if the direction of the door remains in the non-permitted direction for at least a threshold time.

22. A controller for detecting an abnormal use of a door in a mental health environment, comprising:
a communication module configured to receive, from an angle sensor, angle data indicative of a measured angle of the door relative to a door frame in which the door is mounted;
one or more processors; and
a memory storing computer executable instructions therein which, when executed by the one or more processors, cause the one or more processors to:
determine, in dependence on the measured angle of the door, whether the door is in an open state;
if the door is in an open state, determine in dependence on the measured angle a direction of the door to be a first direction or a second direction relative to the door frame; and
output a signal indicative of an abnormal door use if the direction of the door transitions between the first direction and the second direction.

23. One or more non-transitory computer readable media storing executable instructions which, when executed, are arranged to perform a computer-implemented method of monitoring a clinical response in a mental health environment, the method comprising: receiving alarm data indicative of a triggered alarm associated with a door mounted within a door frame; receiving, from an angle sensor, angle data indicative of a measured angle of the door relative to the door frame; detecting an entry through the door in dependence on a change in the measured angle of the door indicated by the angle data; and outputting an indication of a clinical response in dependence on the detection of the opening of the door.

* * * * *